United States Patent
Nakano et al.

(10) Patent No.: US 8,777,585 B2
(45) Date of Patent: Jul. 15, 2014

(54) ELECTRIC COMPRESSOR

(75) Inventors: Koji Nakano, Aichi-ken (JP); Takashi Nakagami, Aichi-ken (JP); Hideto Noyama, Aichi-ken (JP); Masahiko Asai, Aichi-ken (JP); Makoto Hattori, Aichi-ken (JP); Takayuki Takashige, Aichi-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 719 days.

(21) Appl. No.: 12/300,725

(22) PCT Filed: Jun. 24, 2008

(86) PCT No.: PCT/JP2008/061490
§ 371 (c)(1),
(2), (4) Date: Mar. 26, 2009

(87) PCT Pub. No.: WO2009/066483
PCT Pub. Date: May 28, 2009

(65) Prior Publication Data
US 2010/0172764 A1 Jul. 8, 2010

(30) Foreign Application Priority Data
Nov. 22, 2007 (JP) ................. 2007-302605

(51) Int. Cl.
F04B 49/06 (2006.01)
(52) U.S. Cl.
USPC ........... 417/44.11; 417/18; 417/32; 417/44.1; 417/44.5; 417/278; 417/280; 417/282; 310/53; 310/94; 62/126; 62/228.4; 62/230; 62/259.2

(58) Field of Classification Search
USPC ........ 417/18, 32, 44.1, 44.5, 44.11, 212–223, 417/278–311; 62/125–127, 129, 228.4, 62/230, 259.2; 310/53, 94
See application file for complete search history.

(56) References Cited

U.S. PATENT DOCUMENTS
2010/0172765 A1* 7/2010 Shibuya et al. ............ 417/44.11

FOREIGN PATENT DOCUMENTS
| EP | 947374 A2 * | 10/1999 | ............ B60L 3/00 |
| JP | 2004-68807 A | 3/2004 | |
| JP | 2007-92636 A | 4/2007 | |

OTHER PUBLICATIONS
Machine translation Hattori et al JP 2007-062636 A.*
Japanese Notice of Allowance dated Jun. 20, 2012, issued in corresponding application No. 2007-302605, with English Translation.

* cited by examiner

*Primary Examiner* — Nimeshkumar Patel
*Assistant Examiner* — Jose M Diaz
(74) *Attorney, Agent, or Firm* — Westerman, Hattori, Daniels & Adrian, LLP

(57) ABSTRACT

An electric compressor 10 includes a compression mechanism 11, an electric motor 12 driving the compression mechanism 11, and a control portion 13 controlling to drive the electric motor 12, incorporated into a single casing, and further includes a temperature detector 14 detecting a temperature of one or more components constituting one or both of the control portion 13 and the electric motor 12, and a current detector 15 detecting a current flowing through the component. When the temperature detected by the temperature detector 14 is a temperature Td, the current detected by the current detector 15 is a current Id, and a current corresponding to the temperature Td at a temperature characteristic relating to the current specific to the component is a current Ia(Td), the control portion 13 stops driving the electric motor 12 on the basis of a result of comparison between Ia(Td) and Id.

26 Claims, 5 Drawing Sheets

US 8,777,585 B2

ELECTRIC COMPRESSOR

TECHNICAL FIELD

The present invention relates to an electric compressor in which an electric motor that drives a compression mechanism and a control apparatus that controls the electric motor are integrated with the compression mechanism, and more particularly to an electric compressor that can prevent heat damage to a high voltage component such as a switching element provided in the control apparatus.

BACKGROUND ART

A vehicle-mounted air conditioner in an electric vehicle or a fuel cell vehicle with no engine has a compressor including an electric motor as a power source for compressing and circulating a refrigerant. Since the electric motor needs to be rotated at a desired rotational speed according to a command from a main control apparatus of the air conditioning apparatus, a separate control apparatus is required. This control apparatus includes an electrical circuit or an electronic circuit. Specifically, the control apparatus includes electronic elements such as a central processing unit and a memory, and also a switching element (power transistor element) such as an IGBT (Insulated Gate Bipolar Transistor) or an FET (Field Effect Transistor) for constituting a so-called inverter circuit (switching circuit). There is an electric compressor in which the control apparatus, a compression mechanism, and an electric motor are incorporated into one casing for saving space. Hereinafter, this electric compressor is sometimes referred to as an integrated electric compressor.

The switching element has a function of supplying large electric power to the electric motor and controlling the rotational speed of the electric motor. However, the control by the control apparatus is to control the electric motor to rotate at a desired rotational speed according to the command from the main control apparatus. During the control, power consumption becomes too high, and an overcurrent sometimes flows that may damage a high voltage component (hereinafter sometimes simply referred to as component) mounted in the control apparatus of the integrated electric compressor. Thus, the switching element and other components are increased in temperature and damaged (heat damage). In an extreme case, it is supposed that the components rupture or catch fire. The heat damage may occur to components that constitute the electric motor.

Patent Documents 1 and 2 propose protecting a control apparatus of an integrated electric compressor from heat damage.

Patent Document 1 proposes an electric compressor integratedly including a compression mechanism that sucks in and compresses a refrigerant, an electric motor that drives the compression mechanism, and an electrical circuit that controls a rotational speed of the electric motor, wherein the compressor includes protection control means for increasing a rotational speed of the compression mechanism, that is, a rotational speed of the electric motor when a temperature of the electrical circuit exceeds a predetermined temperature, and further when an actual rotational speed of the compression mechanism is a predetermined rotational speed or lower.

This proposal is based on the following findings. Specifically, when the rotational speed of the compression mechanism is relatively low, a cooling effect by the refrigerant falls below calorific values of the electrical circuit and the electric motor, and thus the cooling effect by the refrigerant increases with increasing rotational speed. On the other hand, when the rotational speed of the compression mechanism is relatively high, the calorific values of the electrical circuit and the electric motor exceed the cooling effect by the refrigerant, and thus the temperatures of the electrical circuit and the electric motor compression mechanism increase with increasing rotational speed. Thus, in Patent Document 1, when the temperature of the electrical circuit exceeds the predetermined temperature, the rotational speed of the compression mechanism is increased to reduce the temperatures of the electric motor and the electrical circuit.

Patent Document 2 is based on the findings that a larger amount of refrigerant to be compressed is circulated at higher rotational speeds of an electric compressor, and in combination with an increasing cooling effect of a switching element by the refrigerant, an electric motor of the electric compressor has a larger current margin in a certain rotational speed region than in other regions (paragraph [0025] in Patent Document 2). Specifically, Patent Document 2 proposes a control apparatus for an electric compressor including a rotational speed limit control portion that maintains a rotational speed of an electric motor within a rotational speed between predetermined upper and lower limit rotational speeds in the case where a certain condition A relating to an inverter output current or a switching element temperature that indicates a state that requires protection of the switching element that constitutes a control apparatus of an integrated electric compressor irrespective of an electric motor rotational speed command from a main control apparatus of an air conditioning apparatus.

In Patent Document 2, for example, it is determined whether an actual operation rotational speed of the electric compressor is lower than a predetermined rotational speed N1 when a maximum value of an inverter output current absolute value during one second becomes higher than 0.9 times a known rated current of the switching element. When the actual operation rotational speed is lower than the rotational speed N1, a current margin is small, and thus the rotational speed is increased by a predetermined rotational speed N3. When the actual operation rotational speed is higher than N1 and also higher than N2, the current margin is also small, and thus the rotational speed is reduced by a predetermined rotational speed N4. Then, it is determined whether a rotational speed control operation needs to be continued.

Patent Document 1: Japanese Patent Laid-Open No. 2004-68807

Patent Document 2: Japanese Patent Laid-Open No. 2007-92636

DISCLOSURE OF THE INVENTION

In Patent Document 1, actually, it is determined which of three temperature regions A, E and D (FIG. 4(a) in Patent Document 1) a temperature Ti of the electrical circuit falls within, and details of control of the compression mechanism (electric motor) is determined according to each temperature region. Thus, for example, there is a risk that protection control to stop the electric motor or the like is performed when not necessary at the temperature Ti in terms of a temperature characteristic of the electrical circuit. Specifically, in Patent Document 1, protection control cannot be performed according to a capability of a component to be protected from heat damage. The protection control should be minimized because it may diminish comfortable feelings of a driver and a passenger due to air conditioning.

In Patent Document 2, a standard of 0.9 times the rated current of the switching element is used, but a temperature is still not considered.

The present invention is achieved on the basis of such technical problems, and has an object to provide an electric compressor that can protect a component to be protected from heat damage according to a capability of the component.

FIGS. 3A and 3B respectively show temperature characteristics of a current and electric power of a component. As shown in FIGS. 3A and 3B, the component can generally use a current and electric power up to a maximum absolute rated current and maximum absolute rated electric power at room temperature or lower, but usable current and electric power decrease with increasing temperature. A high current and a high voltage are passed through the component, and if a current and electric power higher than a current (allowable current) and electric power (allowable electric power) specified at each temperature as shown in FIGS. 3A and 3B are used, the temperature increases to cause heat damage.

Thus, the present invention provides an electric compressor characterized by including: a compression mechanism that sucks in a refrigerant and compresses and discharges the refrigerant; an electric motor that drives the compression mechanism; a casing that houses the compression mechanism and the electric motor; a control portion that is housed in the casing and controls to drive the electric motor; a temperature detector that detects a temperature of one or more components that constitute one or both of the control portion and the electric motor; and a current detector that detects a current flowing through the component, wherein the electric compressor protects the component from heat damage in the following manners. Specifically, when the temperature detected by the temperature detector is a temperature Td, the current detected by the current detector when the temperature detector detects the temperature Td is a current Id, and a current corresponding to the temperature Td at a temperature characteristic relating to the current specific to the component is a current Ia(Td), the control portion stops driving the electric motor on the basis of a result of comparison between Ia(Td) and Id.

The electric compressor of the present invention compares the temperature characteristic of the component and the detected temperature Td and current Id to stop driving the electric motor, thereby allowing the component to be protected from heat damage according to a capability of the component.

In the electric compressor of the present invention, when the current corresponding to the temperature Td is a current Ib(Td) at a reduced temperature characteristic with a lower current at each temperature than the temperature characteristic relating to the current specific to the component, the control portion controls to stop driving the electric motor when Ia(Td)≤Id. There is a high risk that the component is subjected to heat damage, and thus the electric motor is stopped to reduce the temperature of the component.

When Ib(Td)≤Id<Ia(Td), the control portion controls to reduce a load of the electric motor. The load of the electric motor is reduced to reduce the temperature of the component of the electric motor, and also reduce the temperature of the component that constitutes the control portion because the flowing current is reduced. Thus, the component is protected from heat damage. The control when Ib(Td)≤Id<Ia(Td) is referred to as protection control.

The protection control may be performed so as to reduce the load of the electric motor, and also to increase a rotational speed of the electric motor when the rotational speed of the electric motor is a predetermined rotational speed x or lower, thereby reducing the temperatures of the component of the electric motor and the component that constitutes the control portion. When the rotational speed of the electric motor exceeds a predetermined rotational speed y, the control may be performed so as to reduce the rotational speed of the electric motor, thereby reducing the temperatures of the component of the electric motor and the component that constitutes the control portion. This is based on the above described findings.

When the component to be protected from heat damage is a switching element for the electric motor provided in the control portion, the protection control is performed so as to reduce a carrier frequency that controls on/off of the switching element. The carrier frequency may be reduced to reduce a calorific value of the switching element.

In the electric compressor of the present invention, when the current corresponding to the temperature Td is a current Ic(Td) (where Ic(Td)<Ib(Td)) at a reduced temperature characteristic with a lower current at each temperature than the temperature characteristic relating to the current specific to the component, the control portion can release the protection control when Id≤Ic(Td).

The present invention may include an electric power detector in place of the current detector, and when a temperature detected by a temperature detector is a temperature Td, electric power detected by the electric power detector when the temperature detector detects the temperature Td is electric power Pd, and electric power corresponding to the temperature Td at a temperature characteristic relating to the electric power specific to the component is electric power Pa(Td), the control portion may stop driving the electric motor on the basis of a result of comparison between Pa(Td) and Pd.

This electric compressor can also perform and release the above described protection control. In this case, Id, Ia(Td), Ib(Td) and Ic(Td) are replaced by Pd, Pa(Td), Pb(Td) and Pc(Td).

According to the present invention, the temperature characteristic of the component and the detected temperature Td and current Id (electric power Pd) are compared to stop driving the electric motor, thereby allowing the component to be protected from heat damage according to a capability of the component.

DESCRIPTION OF SYMBOLS

Figure 1:
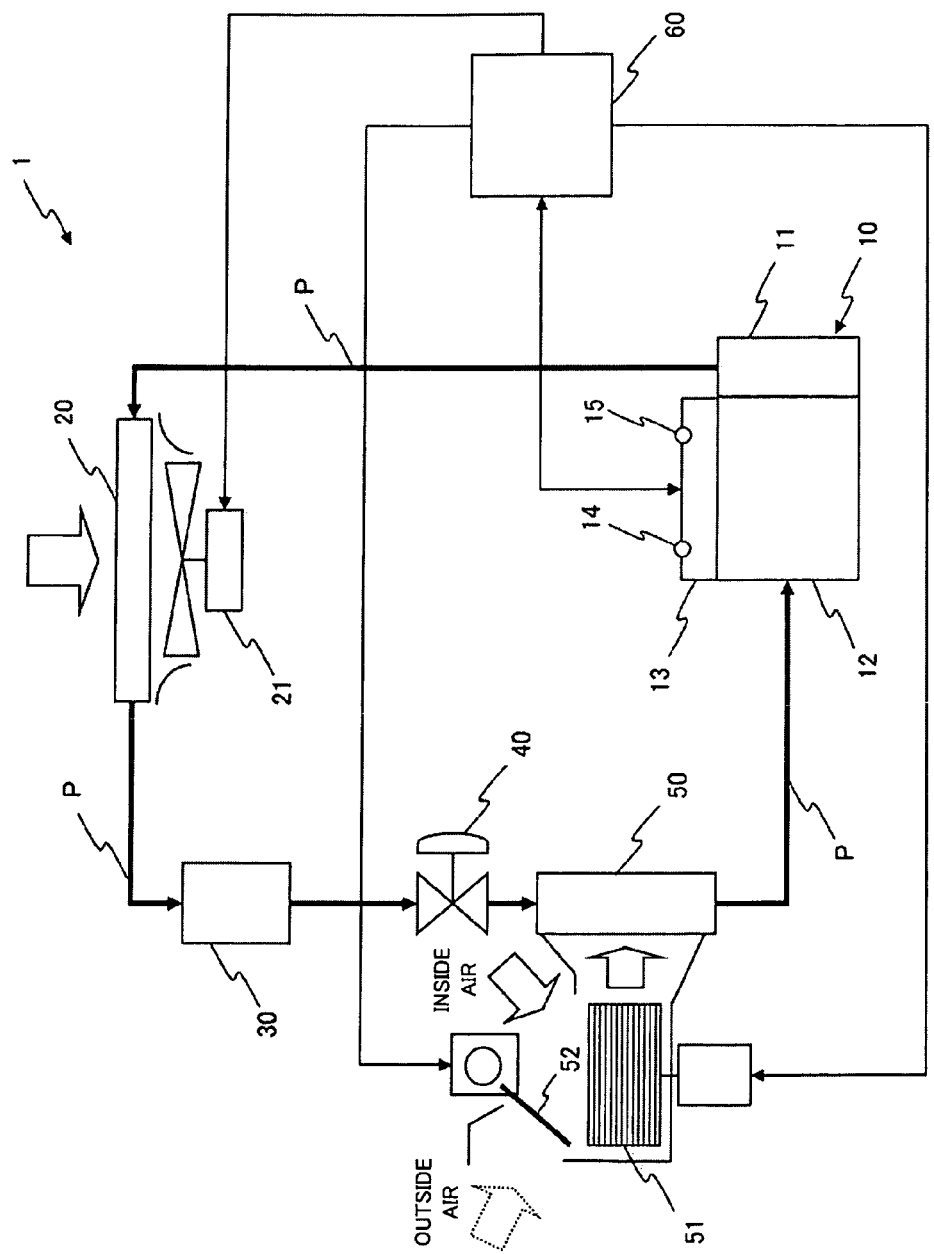
FIG. 1 is a schematic view of a configuration of a vapor compression refrigerator using an electric compressor according to an embodiment.

1 . . . vapor compression refrigerator for vehicle
10 . . . electric compressor
11 . . . compression mechanism
12 . . . electric motor 13 ... control portion
13a ... first control portion
13b ... second control portion
14 ... temperature detector
15 ... current detector
20 ... condenser
21 ... cooling fan
30 ... receiver
40 ... expansion valve
50 ... evaporator
51 ... blower
52 ... inside and outside air switching damper
60 ... main control unit

BEST MODE FOR CARRYING OUT THE INVENTION

Now, an embodiment of the present invention will be described in detail with reference to the accompanying drawings.

The embodiment is applied to an electric compressor of a vapor compression refrigerator for a vehicle (an air conditioning apparatus for a vehicle), and FIG. 1 is a schematic view of a configuration of a vapor compression refrigerator for a vehicle 1 using an electric compressor 10 according to the embodiment.

As shown in FIG. 1, the vapor compression refrigerator 1 includes the electric compressor 10 that compresses a refrigerant into a refrigerant of high temperature and pressure; a condenser 20 that cools and condenses the high temperature and pressure refrigerant; a receiver 30 that performs gas-liquid separation of the refrigerant from the condenser 20; an expansion valve 40 that reduces pressure of the cooled high pressure refrigerant; and an evaporator 50 that evaporates the low pressure refrigerant with reduced pressure to exhibit a refrigeration capability. These components are connected in series by pipes P. The vapor compression refrigerator 1 also includes a main control unit 60 that controls operation of the electric compressor 10 and the condenser 20 or the like on the basis of an air conditioning load.

The electric compressor 10 includes a compression mechanism 11 that sucks in the refrigerant and compresses and discharges the refrigerant, an electric motor 12 that drives the compression mechanism 11, and a control portion 13 including an inverter circuit that controls to drive the electric motor 12. For example, a scroll compressor can be used as the compression mechanism 11, a DC brushless electric motor can be used as the electric motor 12, and the compression mechanism 11 and the electric motor 12 are integrated coaxially and in series.

The electric compressor 10 includes a casing (not shown) that houses the compression mechanism 11, the electric motor 12, and the control portion 13. The electric compressor 10 is configured so that the refrigerant discharged from the evaporator 50 and sucked into the casing of the electric compressor 10 cools the control portion 13, is then sucked and compressed by the compression mechanism 11, and then cools the electric motor 12 and is discharged toward the condenser 20.

Figure 2:
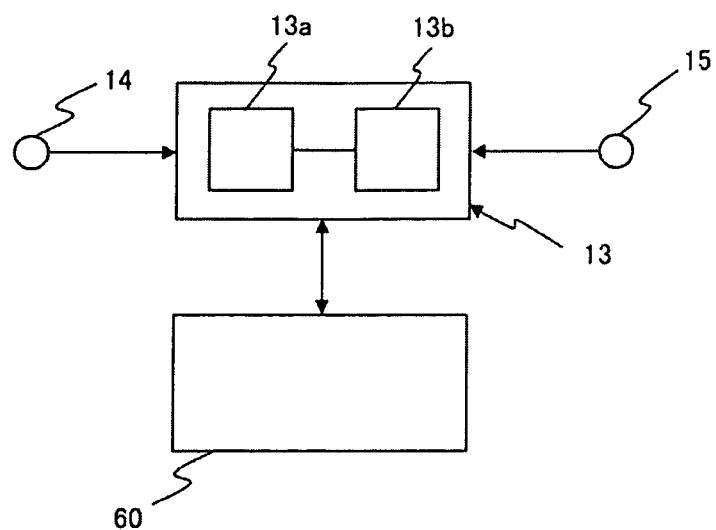
FIG. 2 is a block diagram of a configuration of a control portion of the electric compressor according to the embodiment.

As shown in FIG. 2, the control portion 13 includes a first control portion 13a and a second control portion 13b. The first control portion 13a controls a predetermined current (voltage) to be supplied to the electric motor 12 on the basis of a command from the main control unit 60. The second control portion 13b provides protection determination and a command based thereon to the first control portion 13a. Though not shown in FIG. 2, the control portion 13 includes components such as a switching element, a capacitor, an inductor, or the like that constitute the inverter circuit, and the first control portion 13a and the second control portion 13b control operation of the switching element. In this example, the first control portion 13a and the second control portion 13b are separated, but for example, physically one microcomputer may have functions of the above described two control portions.

The electric compressor 10 includes a temperature detector 14 that detects a temperature Td of the switching element (for example, IGBT) mounted in the control portion 13. The electric compressor 10 also includes a current detector 15 that detects a current Id flowing through the switching element. The temperature Td detected by the temperature detector 14 is provided to the second control portion 13b. The current Id detected by the current detector 15 is also provided to the second control portion 13b. The second control portion 13b performs protection control to protect the switching element from heat damage on the basis of the temperature Td and the current Id. The protection control is performed irrespective of the command from the main control unit 60. In some cases, the main control unit 60 operates for performing the protection control. The details of the control will be described later.

The refrigerant compressed into the refrigerant of high temperature and pressure by the electric compressor 10 (compression mechanism 11) is introduced into the condenser 20. The condenser 20 includes a cooling fan 21 that supplies outside air to the condenser 20. The high temperature and pressure refrigerant introduced into the condenser 20 is cooled by the outside air supplied by the cooling fan 21, condensed and liquefied, and fed to the receiver 30. The cooling fan 21 is generally controlled in operation by the main control unit 60 according to an air conditioning load, but sometimes operates during protection control as described later.

The receiver 30 performs gas-liquid separation of the refrigerant received from the condenser 20. The separated liquid refrigerant is fed to the expansion valve 40. The receiver 30 also stores an excess liquid refrigerant in the vapor compression refrigerator for a vehicle 1.

The high pressure liquid refrigerant received from the receiver 30 is reduced in pressure by the expansion valve 40 into a low-temperature two-phase state, and fed to the evaporator 50.

The evaporator 50 includes a blower 51 and an inside and outside air switching damper 52. The blower 51 drive-controlled by the main control unit 60 supplies outside air or in-vehicle circulation air (inside air) to the evaporator 50 according to a position of the inside and outside air switching damper 52. The refrigerant in the low-temperature two-phase state introduced into the evaporator 50 is subjected to heat exchange (heat absorption) with the outside air or the inside air to again become a gas refrigerant and sucked by the electric compressor 10 (compression mechanism 11). The gas refrigerant is relatively low in temperature, and cools the control portion 13 and the electric motor 12 of the electric compressor 10 as described above.

Next, protection control performed by the control portion 13 and the main control unit 60 will be described. The protection control is performed for protecting the switching element provided in the control portion 13 from heat damage. The component to be protected from heat damage is herein limited to the switching element for description, but it is understood that the present invention may be applied to any of components included in the control portion 13 and the electric motor 12.

Figures 4A, 4B:
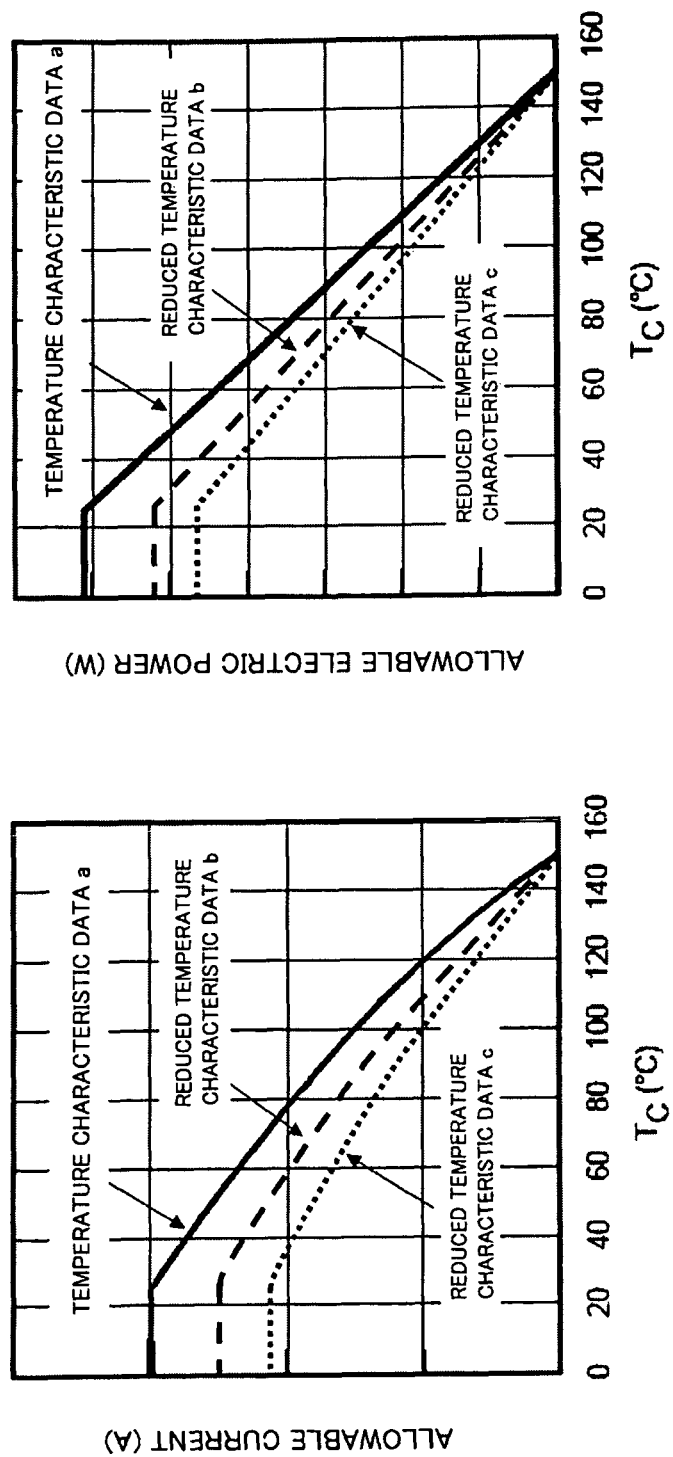
FIG. 4A is a graph showing temperature characteristic data of a current held by a second control portion.
FIG. 4B is a graph showing temperature characteristic data of an electric power held by a second control portion.

FIG. 4A shows a graph showing data on the switching element held by the second control portion 13b plotted on a coordinate with the temperature Tc(° C.) on the axis of abscissa and the allowable current (A) on the axis of ordinate. As shown in FIG. 4A, the second control portion 13b holds three types of data. One is temperature characteristic data a of the switching element. The temperature characteristic data a is specific to the actually used switching element. The second control portion 13b also holds reduced temperature characteristic data b and reduced temperature characteristic data c besides the temperature characteristic data a. As shown in FIG. 4B, the data on the temperature characteristic may relate to a relationship between the temperature Tc and allowable electric power (W).

At the same temperature, an allowable current Ia(Td) of the temperature characteristic data a of the switching element, an allowable current Ib(Td) of the reduced temperature characteristic data b, and an allowable current Ic(Td) of the reduced temperature characteristic data c have a relationship of Ic(Td)<Ib(Td)<Ia(Td).

The allowable current Ib(Td) at room temperature (20° C.) or less of the reduced temperature characteristic data b is set to, for example, about 90% of the allowable current Ia(Td) of the temperature characteristic data a of the switching element. The allowable current Ic(Td) at room temperature (20° C.) or less of the reduced temperature characteristic data c is set to, for example, about 85% of the allowable current Ia(Td) of the temperature characteristic data a of the switching element. At a temperature at which the allowable current Ia(Td) of the temperature characteristic data a of the switching element is zero, the allowable current Ib(Td) of the reduced temperature characteristic data b and the allowable current Ic(Td) of the reduced temperature characteristic data c are both set to zero.

Figure 5:
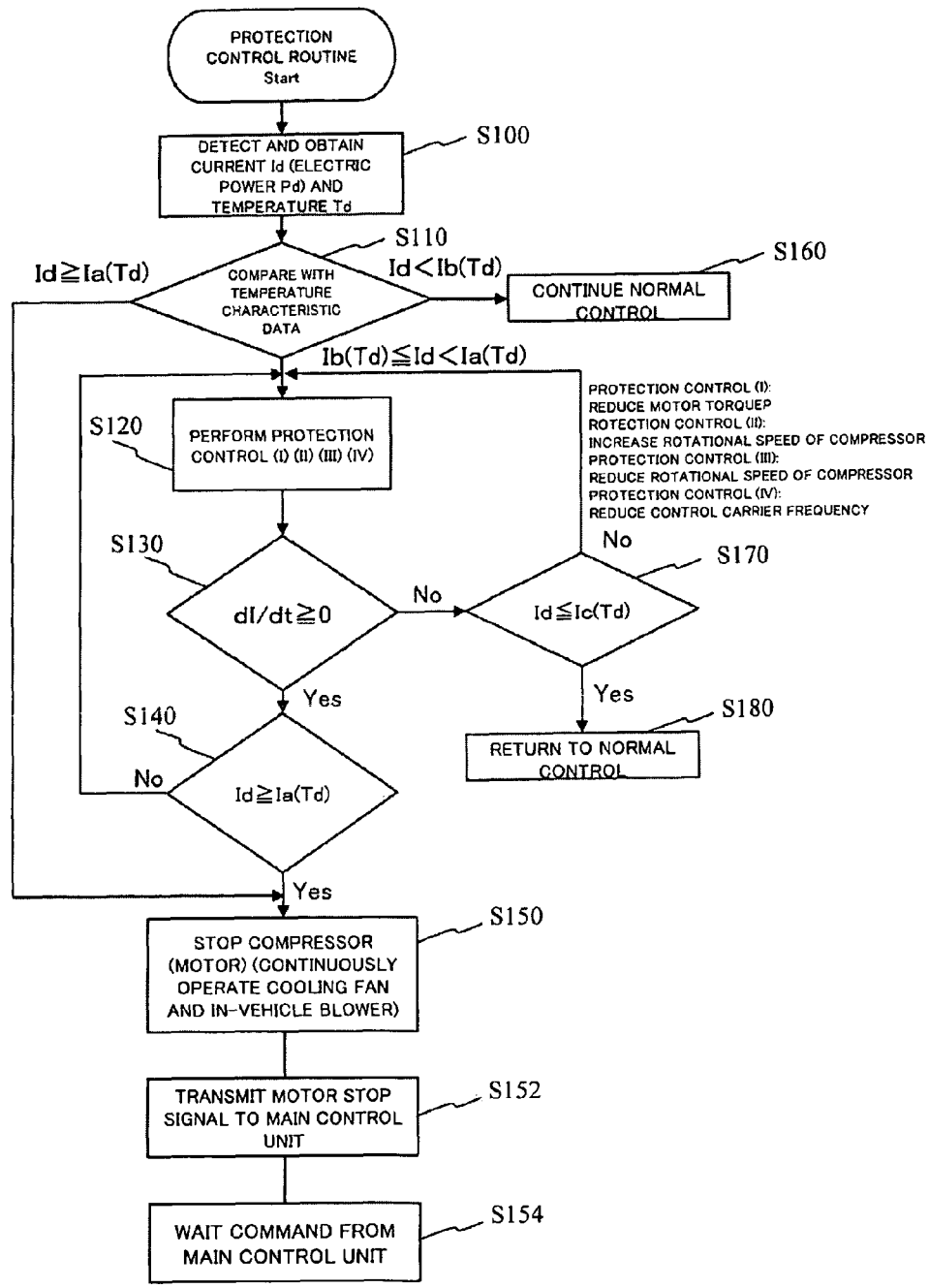
FIG. 5 is a flowchart showing a procedure of protection control of the electric compressor according to the embodiment.

FIG. 5 is a flowchart showing a procedure of the protection control by the second control portion 13b. It is supposed that the vapor compression refrigerator 1 is operated by the control by the main control unit 60 according to an air conditioning load. This control will be hereinafter referred to as normal control.

The second control portion 13b obtains data on the current Id flowing through the switching element detected by the current detector 15, and data on the temperature Td of the switching element detected by the temperature detector 14 (S100 in FIG. 5). In FIG. 5, there is a mention of electric power Pd, which means that the electric power Pd supplied to the switching element may be used in place of the current Id, or the electric power Pd may be used together with the current Id. In the description below, the current Id only will be referred to.

When obtaining data on the detected current Id and temperature Td, the second control portion 13b compares the data with the temperature characteristic data a of the switching element, the reduced temperature characteristic data b, and the reduced temperature characteristic data c (S110 in FIG. 5). Specifically, the current Ia(Td) corresponding to the temperature Td in the temperature characteristic data a, the current Ib(Td) corresponding to the temperature Td in the reduced temperature characteristic data b, and the current Ic(Td) corresponding to the temperature Td in the reduced temperature characteristic data c are compared. The result of comparison is classified into the following three categories:

Id≥Ia(Td)
Id<Ib(Td)
Ib(Td)≤Id<Ia(Td)

When the result of comparison is Id≥Ia(Td), the second control portion 13b determines that the switching element is subjected to heat damage. Thus, the second control portion 13b stops supplying the current to the electric motor 12 to stop operation of the electric motor 12 irrespective of the command from the main control unit 60 (S150 in FIG. 5). Then, a communication system provided in the control portion 13 transmits information on the stop of the supply of the current to the electric motor 12 to the main control unit 60 (S152 in FIG. 5), and then a command from the main control unit 60 is waited (S154 in FIG. 5).

At this time, operation of the cooling fan 21 attached to the condenser 20 and the blower 51 attached to the evaporator 50 is preferably continued. This is for preventing reduction in comfortable feelings due to air conditioning caused by the stop of the electric motor 12 as much as possible.

When the result of comparison is Id<Ib(Td), the normal control is continued without performing the protection control (S160 in FIG. 5). When Id<Ib(Td), the second control portion 13b determines that there is a margin until the allowable current is reached and there is no risk of heat damage to the switching element.

When the result of comparison is Ib(Td)≤Id<Ia(Td), the second control portion 13b performs the protection control (S120 in FIG. 5). Ib(Td)≤Id<Ia(Td) indicates, in FIG. 4A, that the detected current Id falls between a curve for the temperature characteristic data a and a curve for the reduced temperature characteristic data b. In this case, it is determined that there is a risk of heat damage to the switching element, and the protection control is performed.

The protection control is selected from one or a combination of two or more of (I) to (IV) described below.

(I) Reduce Electric Motor Torque

Torque (load) applied to the electric motor 12 is reduced to reduce the current flowing through the switching element of the control portion 13 and supplied to the electric motor 12. The ratio of discharge pressure to suction pressure of the refrigerant in the compression mechanism 11 is reduced to reduce the torque applied to the electric motor 12. To reduce the ratio of discharge pressure to suction pressure, it is only necessary that the discharge pressure is reduced or the suction pressure is increased in the following manners.

Reduction in Discharge Pressure

When a capability (an amount of heat dissipation) of the condenser 20 is increased, the discharge pressure of the compression mechanism 11 can be reduced. Specifically, a rotational speed of the cooling fan 21 is increased to increase an amount of wind passing through the condenser 20, thereby increasing the capability of the condenser 20. The main control unit 60 provides an instruction to increase the rotational speed of the cooling fan 21 to the cooling fan 21 on the basis of an instruction from the second control portion 13b.

Increase in Suction Pressure

When air to the evaporator 50 is introduced from outside air, the inside and outside air switching damper 52 is activated to circulate air in the vehicle (inside air). Then, heat exchange can be facilitated to increase the suction pressure of the compression mechanism 11.

When a capability (an amount of heat absorption) of the evaporator 50 is reduced, the suction pressure of the compression mechanism 11 can be increased. Specifically, a rotational speed of the blower 51 is reduced to reduce an amount of wind passing through the evaporator 50, thereby reducing the capability of the evaporator 50. The reduction in the amount of wind to the evaporator 50 may reduce comfortable feelings due to air conditioning, and an amount of reduction needs to be limited to some extent.

Further, there is a system (dual system) in which two evaporators 50 are provided in the vehicle and placed in parallel on a refrigeration cycle circuit. In the dual system, the two evaporators 50 generally include a large evaporator having a relatively large capability and a small evaporator having a relatively small capability. The large evaporator is for a front seat of the vehicle, and the small evaporator is for a rear part of the vehicle. In the dual system, a rotational speed of a blower attached to the small evaporator provided in the rear part of the vehicle may be reduced, and a rotational speed of a blower attached to the large evaporator may be reduced later as required.

(II) Increase Rotational Speed of Compression Mechanism 11

When a rotational speed of the compression mechanism 11, that is, a rotational speed of the electric motor 12 is a predetermined rotational speed x or lower, the rotational speed of the compression mechanism 11 is increased.

When the rotational speed is relatively low, a cooling effect by the refrigerant falls below a calorific value of the control portion 13 including the switching element, and thus the cooling effect by the refrigerant increases with increaing rotational speed. On the other hand, when the rotational speed is relatively high, the calorific value of the control portion 13 exceeds the cooling effect by the refrigerant, and thus the temperature of the control portion 13 increases with increasing rotational speed. It is understood that the rotational speed of the electric motor 12 needs only to be increased to increase the rotational speed of the compression mechanism 11.

Thus, when the rotational speed of the compression mechanism 11 is the predetermined rotational speed x or lower, the rotational speed is increased to reduce the temperatures of the electric motor 12 and the control portion 13, thereby allowing the switching element to be effectively protected from heat damage. The case where the rotational speed is the predetermined rotational speed x or lower is synonymous with the case where the rotational speed is relatively low. The predetermined rotational speed x can be specified by previously checking a condition that the cooling effect by the refrigerant falls below the calorific value of the control portion 13 including the switching element.

(III) Reduce Rotational Speed of Compression Mechanism 11

When the rotational speed of the compression mechanism 11, that is, the rotational speed of the electric motor 12 is a predetermined rotational speed y or higher, the rotational speed of the compression mechanism 11 is reduced.

As described above, when the rotational speed of the compressor is relatively high, the calorific value of the control portion 13 exceeds the cooling effect by the refrigerant, and thus the temperature of the control portion 13 increases with increasing rotational speed.

Thus, when the rotational speed of the compression mechanism 11 is the predetermined rotational speed y or higher, the rotational speed is reduced to reduce the temperatures of the electric motor 12 and the control portion 13, thereby allowing the switching element to be effectively protected from heat damage. The case where the rotational speed is the predetermined rotational speed y or higher is synonymous with the case where the rotational speed is relatively high. The predetermined rotational speed y can be specified by previously checking a condition that the calorific value of the control portion 13 exceeds the cooling effect by the refrigerant.

(IV) Reduce Carrier Frequency

When the switching element is, for example, an IGBT, an on/off cycle of the IGBT is controlled by a carrier frequency. The carrier frequency is reduced to reduce a calorific value of the IGBT. Thus, the carrier frequency is reduced to allow the IGBT (switching element) to be effectively protected from heat damage. The control of the carrier frequency is performed by the first control portion 13a in the normal control, and performed by the first control portion 13a on the basis of the instruction from the second control portion 13b in the protection control.

The second control portion 13b performs temporal differentiation of the current Id (dI/dt) while continuously detecting the current Id flowing through the switching element after performing the protection control. The second control portion 13b determines whether a value of the temporal differentiation of the current Id is positive (dI/dt≥0) or not (dI/dt<0) (S130 in FIG. 5). When the current Id supplied to the electric motor 12 increases with time or does not change, dI/dt≥0. When the current Id supplied to the electric motor 12 decreases with time, dI/dt<0.

When dI/dt≥0, the second control portion 13b determines whether Id≥Ia(Td) using the temperature Td and the current Id continuously detected, and the current Ia(Td) corresponding to the temperature Td in the temperature characteristic data a of the switching element (S140 in FIG. 5).

When Id≥Ia(Td), the second control portion 13b stops supplying the electric power to the electric motor 12 to stop operation of the compression mechanism 11 (S150 in FIG. 5). Then, the second control portion 13b transmits information on the stop of the supply of the current to the electric motor 12 to the main control unit 60 (S152 in FIG. 5), and then a command from the main control unit 60 is waited (S154 in FIG. 5).

When Id<Ia(Td), the protection control (S120) is continued, the second control portion 13b determines in S130 whether the value of the temporal differentiation of the current Id is positive (dI/dt≥0) or not (dI/dt<0), and the above described procedure is performed on the basis of the result.

When dI/dt<0, the second control portion 13b determines whether Id≤Ic(Td) using the temperature Td and the current Id continuously detected, and the current Ic(Td) corresponding to the temperature Td in the reduced temperature characteristic data c (S170 in FIG. 5). When Id≤Ic(Td), the control by the second control portion 13b is released to return to the normal control (S180 in FIG. 5). When Id>Ic(Td), the protection control (S120) is continued, the second control portion 13b determines in S130 whether the value of the temporal differentiation of the current Id is positive (dI/dt≥0) or not (dI/dt<0), and the above described procedure is performed on the basis of the result.

The above described control procedure will be summarized below.

(1) It is determined in S110 whether the compression mechanism 11 is stopped (S150 in FIG. 5), the normal control is continued without performing the protection control (S160 in FIG. 5), or the protection control is performed (S120 in FIG. 5).

(2) When the protection control is performed (S120 in FIG. 5), it is determined whether the current Id flowing through the switching element tends to increase (including the case of no change) or tends to decrease (S130 in FIG. 5).

When the current Id tends to increase, it is determined in S140 whether the compression mechanism 11 is stopped (S150 in FIG. 5), or the protection control is again performed (S120 in FIG. 5). When the current Id tends to decrease, it is determined whether the protection control can be stopped to return to the normal control (S170 in FIG. 5).

Thus, the control procedure is advanced so as to return to the normal control or stop the compression mechanism 11 when the protection control is performed.

Figure 3B:
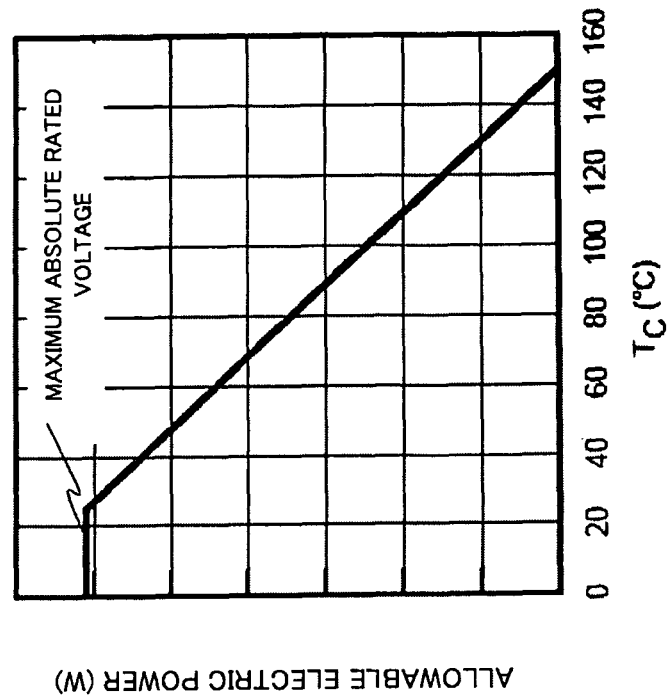
FIG. 3B is a graph showing a temperature characteristic of an electric power of a component to be protected from heat damage.
Figure 3A:
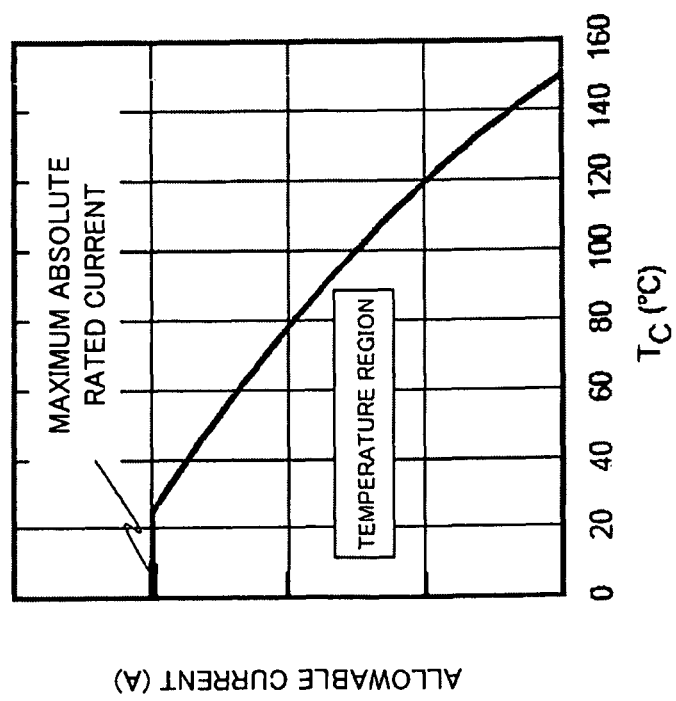
FIG. 3A is a graph showing a temperature characteristic of a current of a component to be protected from heat damage.

As described above, in the embodiment, the temperature characteristic data a on the allowable current of the switching element, the temperature Td of the switching element, and the current Id flowing through the switching element are compared to determine the control procedure thereafter. Thus, in the embodiment, the current Id and the temperature characteristic data a are compared, and the operation of the compression mechanism 11 can be stopped only when the switching element is actually subjected or highly likely to be subjected to heat damage at the temperature in stopping the operation of the compression mechanism 11. Specifically, the switching element can be effectively protected from heat damage while making the most of the capability of the switching element. On the other hand, in control in which a temperature region is determined and operation of a compression mechanism 11 is stopped when a temperature Td of a switching element falls within the temperature region as in Patent Document 1, the operation of the compression mechanism 11 is stopped even when, for example, there is little risk of heat damage to the switching element. This can be easily understood by plotting the temperature region in an overlapping manner on the graph in FIG. 3A.

In the above description, the high voltage component to be protected from heat damage is the switching element, but the high voltage component of the present invention is not limited to this. The control portion 13 includes the components such as the inductor and the capacitor besides the switching element, and the present invention may be widely applied to these components. The present invention may be applied to the components included in the electric motor 12 that rotationally drives the compression mechanism 11.

In the above description, the temperature characteristic data a, the reduced temperature characteristic data b, and the reduced temperature characteristic data c relate to the current, but not limited to the current, the data may relate to electric power in the present invention. The electric power may be used according to a type of a component to be protected from heat damage. For the control procedure in this case, it is only necessary that Id, Ia(Td), Ib(Td), Ic(Td) and dI/dt in FIG. 5 may be replaced by Pd, Pa(Td), Pb(Td), Pc(Td) and dP/dt, respectively. Both the current and voltage may be used.

The invention claimed is:

1. A method of controlling an electric compressor that includes a compression mechanism that sucks in a refrigerant and compresses and discharges the refrigerant, an electric motor that drives said compression mechanism, a casing that houses said compression mechanism and said electric motor, a control portion that is housed in said casing and controls to drive said electric motor, a temperature detector that detects a temperature of one or more components that constitute one or both of said control portion and said electric motor, and a current detector that detects a current flowing through said component, said method comprising the steps of:
    detecting by said temperature detector a temperature Td;
    detecting the current by said current detector when said temperature detector detects said temperature Td a current Id;
    determining a current corresponding to said temperature Td at a temperature characteristic relating to the current specific to said component is a current Ia(Td); and
    stopping the driving of said electric motor on the basis of a result of comparison between Ia(Td) and Id by said control portion.

2. The method of controlling the electric compressor according to claim 1, characterized in that when the current corresponding to said temperature Td is a current Ib(Td) at a reduced temperature characteristic with a lower current at each temperature than the temperature characteristic relating to the current specific to said component, said method further comprises:
    stopping the driving of said electric motor when Ia(Td)≤Id, and performing protection control to reduce a load of said electric motor when Ib(Td)≤Id<Ia(Td).

3. The method of controlling the electric compressor according to claim 1, characterized in that when the current corresponding to said temperature Td is a current Ib(Td) at a reduced temperature characteristic with a lower current at each temperature than the temperature characteristic relating to the current specific to said component, said method further comprises:
    stopping the driving of said electric motor when Ia(Td)≤Id, and performing protection control to increase a rotational speed of said electric motor when Ib(Td)≤Id<Ia(Td) and the rotational speed of said electric motor is a predetermined rotational speed x or lower.

4. The method of controlling the electric compressor according to claim 1, characterized in that when the current corresponding to said temperature Td is a current Ib(Td) at a reduced temperature characteristic with a lower current at each temperature than the temperature characteristic relating to the current specific to said component, said method further comprises:
    stopping the driving of said-electric motor when Ia(Td)≤Id, and performing protection control to reduce the rotational speed of said electric motor when Ib(Td)≤Id<Ia(Td) and the rotational speed of said electric motor exceeds a predetermined rotational speed y.

5. The method of controlling the electric compressor according to claim 1, characterized in that when said component is a switching element for said electric motor provided in said control portion, and the current corresponding to said temperature Td is a current Ib(Td) at a reduced temperature characteristic with a lower current at each temperature than the temperature characteristic relating to the current specific to said component, said method further comprises:
    stopping the driving of said electric motor when Ia(Td)≤Id, and performing protection control to reduce a carrier frequency that controls on/off of said switching element when Ib(Td)≤Id<Ia(Td).

6. The method of controlling the electric compressor according to claim 2, characterized in that when the current corresponding to said temperature Td is a current Ic(Td) (where Ic(Td)<Ib(Td)) at a reduced temperature characteristic with a lower current at each temperature than the temperature characteristic relating to the current specific to said component, said method further comprises:
    releasing said protection control when Id≤Ic(Td).

7. A method of controlling an electric compressor that includes a compression mechanism that sucks in a refrigerant and compresses and discharges the refrigerant, an electric motor that drives said compression mechanism, a casing that houses said compression mechanism and said electric motor, a control portion that is housed in said casing and controls to drive said electric motor, a temperature detector that detects a temperature of one or more components that constitute one or both of said control portion and said electric motor, and an electric power detector that detects electric power flowing through said component, said method comprising the steps of:
    detecting by said temperature detector a temperature Td;
    detecting the electric power by said electric power detector when said temperature detector detects said temperature Td is electric power Pd;
    determining electric power corresponding to said temperature Td at a temperature characteristic relating to the electric power specific to said component is electric power Pa(Td); and stopping the driving of said electric motor on the basis of a result of comparison between Pa(Td) and Pd by said control portion.

8. The method of controlling the electric compressor according to claim 7, characterized in that when the electric power corresponding to said temperature Td is electric power Pb(Td) at a reduced temperature characteristic with lower electric power at each temperature than the temperature characteristic relating to the electric power specific to said component, said method further comprises:
   stopping the driving of said electric motor when Pa(Td)≤Pd, and performing protection control to reduce a load of said electric motor when Pb(Td)≤Pd<Pa(Td).

9. The method of controlling the electric compressor according to claim 7, characterized in that when the electric power corresponding to said temperature Td is electric power Pb(Td) at a reduced temperature characteristic with lower electric power at each temperature than the temperature characteristic relating to the electric power specific to said component, said method further comprises:
   stopping the driving of said electric motor when Pa(Td)≤Pd, and performing protection control to increase a rotational speed of said electric motor when Pb(Td)≤Pd<Pa(Td) and the rotational speed of said electric motor is a predetermined rotational speed x or lower.

10. The method of controlling the electric compressor according to claim 7, characterized in that when the electric power corresponding to said temperature Td is electric power Pb(Td) at a reduced temperature characteristic with lower electric power at each temperature than the temperature characteristic relating to the electric power specific to said component, said method further comprises:
   stopping the driving of said electric motor when Pa(Td)≤Pd, and performing protection control to reduce the rotational speed of said electric motor when Pb(Td)≤Pd<Pa(Td) and the rotational speed of said electric motor exceeds a predetermined rotational speed y.

11. The method of controlling the electric compressor according to claim 7, characterized in that when said component is a switching element for said electric motor provided in said control portion, and the electric power corresponding to said temperature Td is electric power Pb(Td) at a reduced temperature characteristic with lower electric power at each temperature than the temperature characteristic relating to the electric power specific to said component, said method further comprises:
   stopping the driving of said electric motor when Pa(Td)≤Pd, and performing protection control to reduce a carrier frequency that controls on/off of said switching element when Pb(Td)≤Pd<Pa(Td).

12. The method of controlling the electric compressor according to claim 7, characterized in that when the electric power corresponding to said temperature Td is electric power Pc(Td) (where Pc(Td)<Pb(Td)) at a reduced temperature characteristic with lower electric power at each temperature than the temperature characteristic relating to the electric power specific to said component, said method further comprises:
   releasing said protection control when Pd≤Pc(Td).

13. An electric compressor used in the method defined in claim 1.

14. An electric compressor used in the method defined in claim 7.

15. An electric compressor, comprising:
   a compression mechanism that sucks in a refrigerant and compresses and discharges the refrigerant;
   an electric motor that drives said compression mechanism;
   a casing that houses said compression mechanism and said electric motor;
   a control portion that is housed in said casing and controls to drive said electric motor;
   a temperature detector that detects a temperature Td of one or more components that constitute one or both of said control portion and said electric motor; and
   a current detector that detects a current Id flowing through said component when said temperature detector detects said temperature Td,
   said control portion comprising a microcomputer configured to determine a current Ia(Td) corresponding to said temperature Td based on a temperature characteristic relating to the current specific to said component and to stop driving said electric motor on the basis of a result of comparison between Ia(Td) and Id.

16. The electric compressor according to claim 15, characterized in that when the current corresponding to said temperature Td is a current Ib(Td) at a reduced temperature characteristic with a lower current at each temperature than the temperature characteristic relating to the current specific to said component,
   said control portion controls to stop driving said electric motor when Ia(Td)≤Id, and performs protection control to reduce a load of said electric motor when Ib(Td)≤Id<Ia(Td).

17. The electric compressor according to claim 15, characterized in that when the current corresponding to said temperature Td is a current Ib(Td) at a reduced temperature characteristic with a lower current at each temperature than the temperature characteristic relating to the current specific to said component,
   said control portion controls to stop driving said electric motor when Ia(Td)≤Id, and performs protection control to increase a rotational speed of said electric motor when Ib(Td)≤Id<Ia(Td) and the rotational speed of said electric motor is a predetermined rotational speed x or lower.

18. The electric compressor according to claim 15, characterized in that when the current corresponding to said temperature Td is a current Ib(Td) at a reduced temperature characteristic with a lower current at each temperature than the temperature characteristic relating to the current specific to said component,
   said control portion controls to stop driving said electric motor when Ia(Td)≤Id, and performs protection control to reduce the rotational speed of said electric motor when Ib(Td)≤Id<Ia(Td) and the rotational speed of said electric motor exceeds a predetermined rotational speed y.

19. The electric compressor according to claim 15, characterized in that when said component is a switching element for said electric motor provided in said control portion, and
   the current corresponding to said temperature Td is a current Ib(Td) at a reduced temperature characteristic with a lower current at each temperature than the temperature characteristic relating to the current specific to said component,
   said control portion controls to stop driving said electric motor when Ia(Td)≤Id, and performs protection control to reduce a carrier frequency that controls on/off of said switching element when Ib(Td)≤Id<Ia(Td).

20. The electric compressor according to claim 16, characterized in that when the current corresponding to said temperature Td is a current Ic(Td) (where Ic(Td)<Ib(Td)) at a reduced temperature characteristic with a lower current at each temperature than the temperature characteristic relating to the current specific to said component, said control portion releases said protection control when Id≤Ic(Td).

21. An electric compressor characterized by comprising:
a compression mechanism that sucks in a refrigerant and compresses and discharges the refrigerant;
an electric motor that drives said compression mechanism;
a casing that houses said compression mechanism and said electric motor;
a control portion that is housed in said casing and controls to drive said electric motor;
a temperature detector that detects a temperature Td of one or more components that constitute one or both of said control portion and said electric motor; and
an electric power detector that detects electric power Pd flowing through said component when said temperature detector detects said temperature Td,
said control portion comprising a microcomputer configured to determine electric power Pa(Td) corresponding to said temperature Td based on a temperature characteristic relating to the electric power specific to said component and to stop driving said electric motor on the basis of a result of comparison between Pa(Td) and Pd.

22. The electric compressor according to claim 21, characterized in that when the electric power corresponding to said temperature Td is electric power Pb(Td) at a reduced temperature characteristic with lower electric power at each temperature than the temperature characteristic relating to the electric power specific to said component,
said control portion controls to stop driving said electric motor when Pa(Td)≤Pd, and performs protection control to reduce a load of said electric motor when Pb(Td)≤Pd<Pa(Td).

23. The electric compressor according to claim 21, characterized in that when the electric power corresponding to said temperature Td is electric power Pb(Td) at a reduced temperature characteristic with lower electric power at each temperature than the temperature characteristic relating to the electric power specific to said component,
said control portion controls to stop driving said electric motor when Pa(Td)≤Pd, and performs protection control to increase a rotational speed of said electric motor when Pb(Td)≤Pd<Pa(Td) and the rotational speed of said electric motor is a predetermined rotational speed x or lower.

24. The electric compressor according to claim 21, characterized in that when the electric power corresponding to said temperature Td is electric power Pb(Td) at a reduced temperature characteristic with lower electric power at each temperature than the temperature characteristic relating to the electric power specific to said component,
said control portion controls to stop driving said electric motor when Pa(Td)≤Pd, and performs protection control to reduce the rotational speed of said electric motor when Pb(Td)≤Pd<Pa(Td) and the rotational speed of said electric motor exceeds a predetermined rotational speed y.

25. The electric compressor according to claim 21, characterized in that when said component is a switching element for said electric motor provided in said control portion, and
the electric power corresponding to said temperature Td is electric power Pb(Td) at a reduced temperature characteristic with lower electric power at each temperature than the temperature characteristic relating to the electric power specific to said component,
said control portion controls to stop driving said electric motor when Pa(Td)≤Pd, and performs protection control to reduce a carrier frequency that controls on/off of said switching element when Pb(Td)≤Pd<Pa(Td).

26. The electric compressor according to 21, characterized in that when the electric power corresponding to said temperature Td is electric power Pc(Td) (where Pc(Td)<Pb(Td)) at a reduced temperature characteristic with lower electric power at each temperature than the temperature characteristic relating to the electric power specific to said component,
said control portion releases said protection control when Pd≤Pc(Td).

* * * * *